Jan. 31, 1939. H. H. CANTERBURY 2,145,582
TRANSMISSION
Filed Sept. 8, 1936 2 Sheets-Sheet 1

Inventor
Harry H. Canterbury.

Attorney.

Jan. 31, 1939.    H. H. CANTERBURY    2,145,582
TRANSMISSION
Filed Sept. 8, 1936    2 Sheets-Sheet 2

Inventor
Harry H. Canterbury.

T. H. Rodgers
Attorney.

Patented Jan. 31, 1939

2,145,582

UNITED STATES PATENT OFFICE 2,145,582

TRANSMISSION

Harry H. Canterbury, Whittier, Calif.

Application September 8, 1936, Serial No. 99,785

7 Claims. (Cl. 74—284)

The present invention is concerned with variable transmission or speed reducing devices, and especially transmissions of high reduction ratio having means to uninterruptedly vary the ratio over the entire range of the device.

Mechanisms of this type find many uses industrially, but the transmission of my invention is especially designed to afford very accurate control of slowly moving parts which require an infinitely variable speed control. For some purposes it is desired to have a transmission capable of speed ratios from the vicinity of 100 or 200 to 1 between the drive and driven shafts and infinitely variable to even higher ratios at which the speed of the driven shaft approaches and may reach zero. Low speed transmissions of this kind are usually required to handle only a low torque.

It is a general object of my invention to provide a low torque transmission adapted to large speed reductions, running as high as infinity to one at which the rotational speed of the driven member is zero.

Another object of the invention is to provide a transmission in which the reduction ratio can be infinitely or continuously varied over the entire range of the mechanism with a high degree of accuracy.

It is also an object to provide a simple, efficient transmission permitting change in the speed ratio while the parts are in motion under load without interrupting the continuity of the driving connection.

A further object is to provide a transmission in which the direction of the output shaft can be reversed by varying the speed ratio from a plus value through zero to a minus value.

How the above and other objects and advantages of my invention are attained will be more clearly understood by reference to the following description of a present preferred form of transmission and the annexed drawings, in which.

Figure 1:
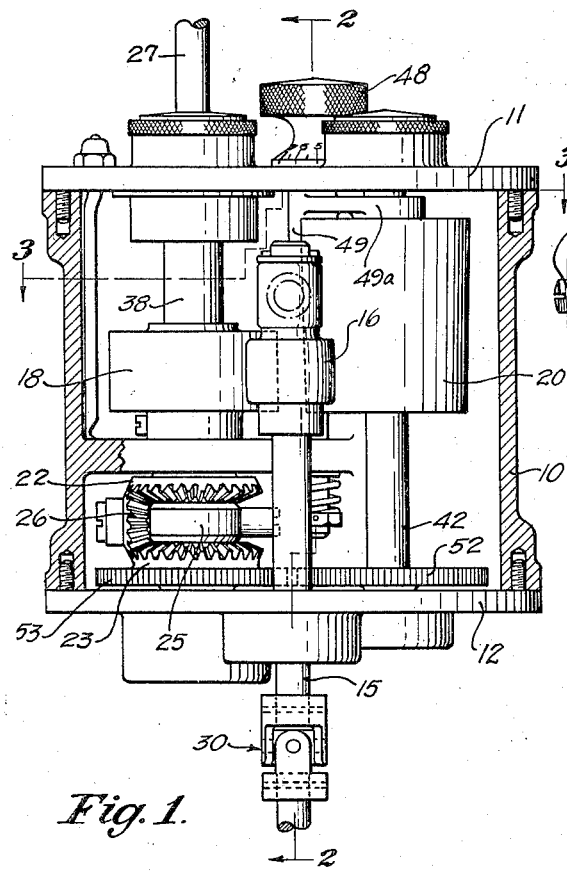
Figure 1 is a side elevation, with half of the housing broken away, of a transmission constructed in accord with my invention.
Figure 2:
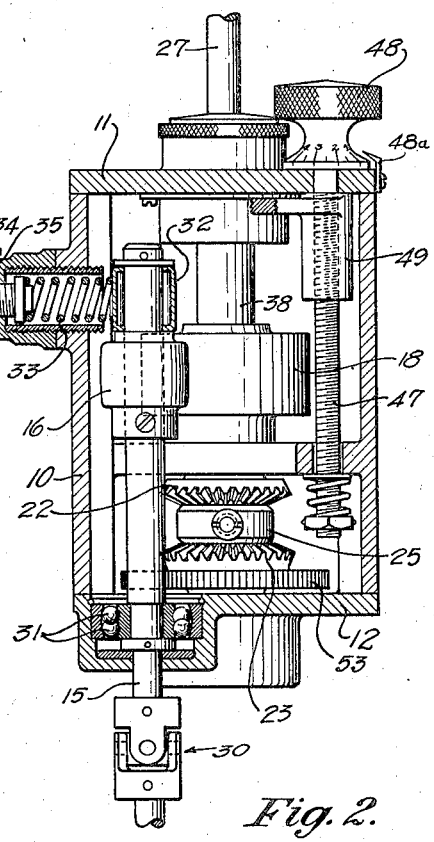
Figure 2 is a vertical section on line 2—2 of Figure 1.
Figure 3:
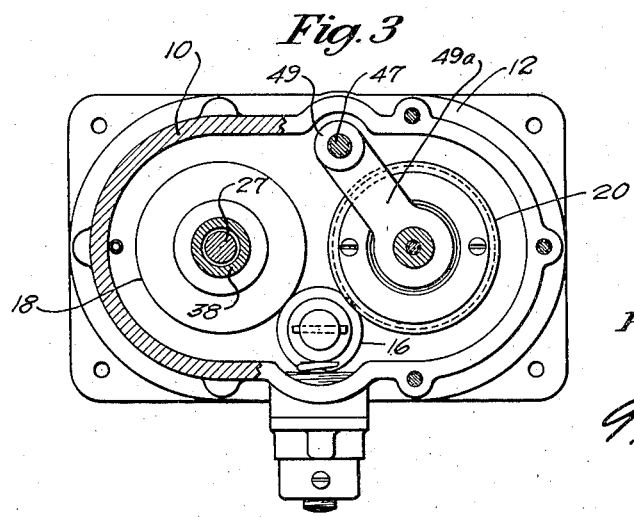
Figure 3 is a horizontal section on line 3—3 of Figure 1.

Briefly summarized, the transmission or speed reducer comprises a housing 10 with an upper cover plate 11 and a lower cover plate 12. The power enters by drive shaft 15 on which is driving member 16 which directly drives the two driven members 18 and 20 (see Figures 1 and 5) by frictional contact. The two members 18 and 20 are connected, through mechanism to be described, to bevel gears 22 and 23 respectively forming parts of a differential mechanism that drives spider 25 and pinion 26 connected to the power take-off shaft 27. The mechanism shown is designed especially for vertical positions of shafts 15 and 27 and will be described in this position though without limitation thereto since it can be used in or designed for any desired position.

Drive shaft 15 may be connected to any suitable source of power and is preferably coupled thereto by a universal joint, as at 30, so that angular displacement of shaft 15 will not cause the mechanism to bind. The lower end of shaft 15 is journaled in ball bearing 31 housed in lower plate 12 and of a type to permit slight angular deviation of shaft 15 from parallelism with the shafts of the driven members. Near the upper end of the drive shaft is fastened the generally cylindrical driving element 16 which is fastened to the shaft by a set screw or other suitable means. The upper end of drive shaft 15 is retained in bearing 32 upon which spring 33 seats to resiliently press drum 16 against both the driven elements 18 and 20 throughout the entire range of effective diameters of member 20. The pressure of spring 33 is adjusted by screw 34, set screw 35 being provided to lock screw 34 in adjusted positions.

Figure 4:
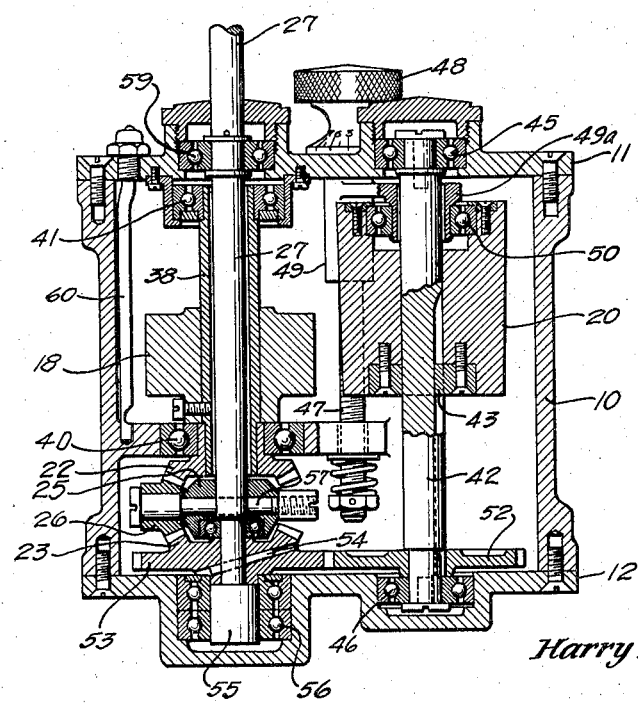
Figure 4 is a vertical median section in the same aspect as Figure 1.

Driven element 18 is a cylinder of uniform diameter and is fastened to hollow shaft 38, as may be seen in Figure 4, which has mounted on its lower end bevel gear 22. The shaft and gear are supported in a ball bearing 40 mounted in a rib of the housing 10. The upper end of shaft 38 is journaled in ball bearing 41 carried on the upper cover plate.

Driven element 20 is a frusto-conical member sliding axially along shaft 42 but keyed to it by key 43 sliding in a longitudinal keyway in the shaft. Shaft 42 is supported at its upper and lower ends by bearings 45 and 46 respectively carried in the upper and lower cover plates.

Cone 20 is moved into the desired position along shaft 42 by any suitable means, here shown as comprising lead screw 47, provided with a knob 48 on its upper end, and threaded collar 49 on the screw. Collar 49 has an arm 49a to the outer end of which is rotatably attached conical member 20, rotation of the cone being permitted by bearing 50 fastened to both the arm and the cone. Movement of the cone is effected by turning knob 48 which may be calibrated so that with the aid of pointer 48a or other index means the relative position of the parts is visually indicated. As cone 20 moves axially to change its effective diameter at the point of contact with driver 16, bearing 31 and spring 33 keep driver 16 continuously in driving engagement with both driven members.

On the lower end of shaft 42 and keyed thereto is spur gear 52 which meshes with a similar gear 53 of the same diameter fastened by pin 54 to shaft 55 which is supported in bearings 56. Two bearings are used at 56 to give sufficient depth of support to shaft 55 to hold it steady and concentric to hollow shaft 38. Formed integrally with spur gear 53 is bevel gear 23.

Spider 25 is rotatably mounted on the upper end of shaft 55 and carries on a transverse shaft 57, pinion 26, which meshes with both bevel gears 22 and 23. As will be further described, bevel gears 22 and 23, spider 25, and pinion 26 form a differential of a conventional type with the spider rotating according to the differential in speeds of the two bevel gears. This rotation of the spider is communicated to the power take-off shaft 27 as the spider is mounted on the lower end of shaft 27 which extends inside and coaxially of shaft 38 through bearing 59 in the upper cover plate.

For lubrication purposes oil tube 60 is provided. Oil placed in the upper end issues at the lower end and runs into bearing 40. The oil works through this bearing and lubricates the differential beneath. Bearings 59, 41, and 45 can be lubricated directly by removing the dust caps over the bearings.

Figure 5:
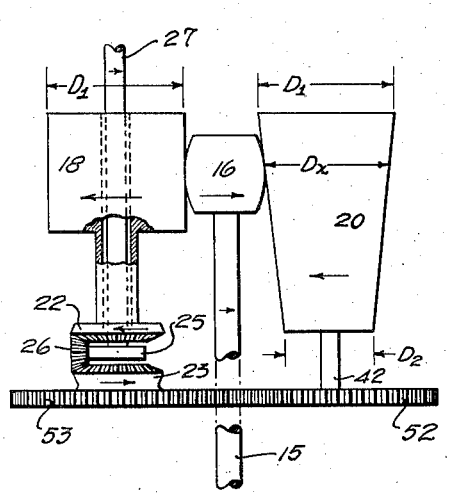
Figure 5 is a diagram illustrating in a simplified manner the operation of the transmission.

The operation of the transmission will be readily understood from the diagrammatic showing in Figure 5. One driven member 18 is a cylinder of uniform diameter while the other driven member 20 is of non-uniform diameter, preferably being frusto-conical so that the straight tapered sides provide a member whose diameter varies at a constant rate. The driving member is nearly cylindrical but preferably has slightly convex sides as this shape shortens the axial length of the contact area between the driver and the driven members to a narrow band which for practical purposes is considered as a short cylinder of uniform diameter, as the convex shape makes the contacts with the two driven members on the driver more accurately diametrically opposite each other. Of course the shapes of the parts are exaggerated in Figure 5 for purposes of illustration, for in both members 16 and 20 the difference between maximum and minimum diameters is preferably of the order of only a few thousandths or perhaps hundredths of an inch, though differences of much larger orders of magnitude can be used at the expense of accuracy. These three members may be made of any desired material affording a smooth surface having a suitably high coefficient of friction to transmit power frictionally between the members and not too soft or easily deformable. One satisfactory substance is Bakelite or a like material.

In the form shown, the conical member 20 has its largest effective diameter $D1$ equal to the diameter $D1$ of the other driven member 18 and its smallest diameter some smaller value $D2$. When driver 16 contacts the cone at a point where the latter's effective diameter is $D1$, then both the driven members 18, 20 rotate at the same speed. Consequently bevel gears 22 and 23 also rotate at the same speed, but in opposite directions, and while pinion 26 turns on its shaft 57, there is no rotation of spider 25 so that the take-off shaft 27 remains stationary. If now screw 47 is turned by means of knob 48 and cone 20 is raised on shaft 42, as in Figure 1, then the effective diameter of the driven cone is some value $Dx$ less than $D1$, being adjustable to and including the smallest value $D2$ at the operator's wish. Cone 20 now rotates faster than cylinder 18, though both turn in the same direction and opposite to the driving element. Consequently bevel gear 23 will rotate at a speed greater than does bevel gear 22, and spider 25 will turn in the direction of the faster moving gear, namely gear 23, but at a rotational speed equal to one-half the difference in rotational speeds of gears 22 and 23. The arrows indicate the various directions of rotation of the several parts for a given direction of driving shaft 15.

The R. P. M. of the power take-off shaft 27 varies with the effective diameter $Dx$ of the cone at the point of driving contact and the speed $R$ of drive shaft 15 according to the following formula, in which $K$ is a constant determined by the diameter of driving member 16:

$$R.P.M. = \tfrac{1}{2} R \cdot K \left( \frac{1}{Dx} - \frac{1}{D1} \right)$$

From this formula it is apparent that for a given value of $D1$, the overall speed reduction of the transmission is controlled by the taper of cone 20 and its length as these determine $Dx$. While the formula assumes a constant or uniform diameter of the driving roll 16, any deviation from that strict condition can be easily compensated for either in design or in operation. As stated above, the transmission is designed to produce a large reduction in speed for driving a shaft very slowly. By way of example, if $D1 = 1.00$ inch and $Dx = D2 = .98$ inch then the output R. P. M. $= .01 K \cdot R$ as the maximum speed of driven shaft 27. From this maximum, the speed is infinitely variable down to zero.

Figure 6:
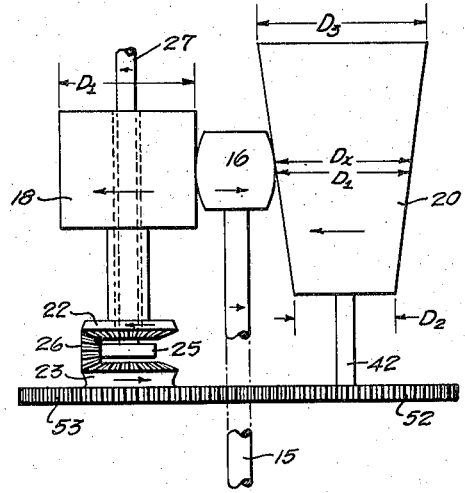
Figure 6 is a diagram similar to Figure 5 illustrating a variational form of the transmission in which the driven shaft is reversed in direction as the ratio passes through zero.

It will be at once apparent that the direction of rotation for output shaft 27 can be reversed by making the smallest diameter of driven roll 20 equal to $D1$, for then gear 22 will rotate faster than gear 23 for $Dx$ is greater than $D1$ (see Figure 6). Or, by placing the effective diameter $D1$ between the smaller end $D2$ and the larger end $D3$ of the cone, as in Figure 6, the output shaft can be driven in either direction with the overall speed ratios passing from a plus value through zero to a minus value. If it is not desired to bring the shaft 27 down to zero speed, then the cone used for roll 20 may be such that the value $D1$ lies only in the extension of the cone beyond the actual range of contact with driver 16.

Having described a preferred form of my invention, it will be apparent that changes in design, construction, and arrangement of parts may be made without departing from the spirit of my invention; and therefore the foregoing is to be considered illustrative of rather than restrictive upon the claims appended hereto.

I claim as my invention:

1. In a variable speed transmission, the combination of a rotatable driving member turning about its axis; a first driven member in direct contact with the driving member and rotated thereby at a constant speed; a second driven member in direct contact with the driving member and rotated thereby at a predetermined variable speed; the axes of both said driven members being fixed substantially parallel to and at opposite sides of the axis of the driving member, and the points of contact of the driving with the driven members being approximately in a common plane transverse to the axis of the driving member; and a differential mechanism drivingly connected to the two driven members and including a shaft rotating at a speed proportional to the difference in speeds of the two driven members.

2. In a variable speed transmission, the combination of a rotatable driving member; a first driven member rotated by the driving member; and a second driven member of non-uniform diameter frictionally rotated by peripheral engagement with the driving member; means to effect the frictional driving engagement of the driving and second driven members at selected points of different diameters of the second member to change the rotational speed of the second driven member; a differential mechanism drivingly connected to the two driven members and including a shaft rotating at a speed proportional to the difference in speeds of the two driven members.

3. In a variable speed transmission, the combination of a rotatable driving member; a first driven member rotated by the driving member; a second driven member rotated by the driving member, said second member being of frusto-conical shape and driven by direct frictional contact with said driving member; means to permit axial movement of the conical member to effect a change of diameter at its point of contact with the driving member in order to vary its rotational speed; a differential mechanism drivingly connected to both driven members and including a shaft rotating at a speed proportional to the difference in speeds of the two driven members.

4. In a variable speed transmission, the combination of a rotatable driving member; a first driven member of uniform diameter rotated at a constant speed by the driving member; a second driven member of varying diameter in direct engagement with the driving member rotated by the driving member at a predetermined variable speed, said second member having an effective diameter at one end equal to the diameter of the first driven member; means to move the second driven member to effect a change of diameter at the point of contact with the driving member; and a differential mechanism drivingly connected to the two driven members and including a shaft rotating at a speed proportional to the difference in speeds of the two driven members.

5. In a variable speed transmission, the combination of a rotatable driving member; a first driven member of uniform diameter rotated at a constant speed by the driving member; a second driven member of varying diameter in direct engagement with the driving member rotated by the driving member at a predetermined variable speed, said second member having a diameter at some point intermediate its ends equal to the diameter of the first driven member; means to move the second driven member to effect a change of diameter at the point of contact with the driving member; and a differential mechanism drivingly connected to the two driven members and including a shaft rotating at a speed proportional to the difference in speeds of the two driven members.

6. In a variable speed transmission, the combination of a rotatable driving member; a first driven member of uniform diameter rotated by the driving member; a second driven member of varying diameter rotated by the driving member, said member being movable axially to bring points of different diameter into contact with the driving member; means mounting the driving member for limited angular deviation; and means to hold the driving member continuously in contact with both driven members throughout the entire range of diameters of the second driven member.

7. In a variable speed transmission, the combination of a rotatable driving member; a first driven member rotated by the driving member; a second driven member rotated by the driving member, said second member being of frusto-conical shape and driven by frictional contact with said driving member; means to permit axial movement of the conical member to effect a change of diameter at its point of contact with the driving member in order to vary its rotational speed; a differential mechanism including a pair of bevel gears drivingly connected one to each of the two driven members and rotating at speeds proportional to the speeds of the driven members, and a spider drivingly connected to both bevel gears; and a power take-off shaft rotated by the spider.

HARRY H. CANTERBURY.